United States Patent
Tanaka et al.

(10) Patent No.: US 10,491,960 B2
(45) Date of Patent: Nov. 26, 2019

(54) CUSTOMIZABLE ELECTRONIC PROGRAM GUIDE

(71) Applicant: SONY INTERACTIVE ENTERTAINMENT LLC, San Mateo, CA (US)

(72) Inventors: Yumiko Tanaka, London (GB); Shingo Kurokawa, San Francisco, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 14/937,618

(22) Filed: Nov. 10, 2015

(65) Prior Publication Data

US 2016/0192019 A1 Jun. 30, 2016

Related U.S. Application Data

(60) Provisional application No. 62/077,773, filed on Nov. 10, 2014.

(51) Int. Cl.
G06F 3/0482 (2013.01)
H04N 21/482 (2011.01)
H04N 21/45 (2011.01)
H04N 21/431 (2011.01)

(52) U.S. Cl.
CPC ....... H04N 21/4821 (2013.01); G06F 3/0482 (2013.01); H04N 21/4312 (2013.01); H04N 21/4532 (2013.01)

(58) Field of Classification Search
CPC ........... H04N 21/4821; H04N 21/4312; H04N 21/4532; G06F 3/0482; G06F 3/04842; G06F 3/04847

USPC .......................................................... 725/46
See application file for complete search history.

(56) References Cited

U.S. PATENT DOCUMENTS

| | | | | |
|---|---|---|---|---|
| 6,057,831 A | * | 5/2000 | Harms | H04N 5/445 348/E17.001 |
| 6,681,395 B1 | * | 1/2004 | Nishi | H04H 60/07 348/E5.105 |
| 7,593,003 B2 | | 9/2009 | Koresawa et al. | |
| 8,302,125 B2 | | 10/2012 | Ku | |
| 8,719,870 B1 | * | 5/2014 | Davies | H04N 5/44543 725/39 |
| 2003/0070171 A1 | * | 4/2003 | Jeon | H04N 5/44543 725/56 |
| 2005/0114886 A1 | * | 5/2005 | Koresawa | H04N 5/44543 725/44 |
| 2005/0289596 A1 | * | 12/2005 | Ku | H04N 5/4403 725/51 |

(Continued)

OTHER PUBLICATIONS

Teoh, Vincent; Panasonic TH42PX80 Operation; Mar. 10, 2008.

*Primary Examiner* — Nathan J Flynn
*Assistant Examiner* — Caroline Somera
(74) *Attorney, Agent, or Firm* — Trellis IP Law Group, PC (57) ABSTRACT

Implementations generally relate to electronic program guides. In some implementations, a method includes causing a main view of an electronic program guide to be displayed. The method further includes receiving one or more user preferences associated with the electronic program guide. The method further includes causing content items to be displayed in the electronic program guide based on the one or more user preferences.

16 Claims, 7 Drawing Sheets

(56) References Cited

U.S. PATENT DOCUMENTS

| | | | |
|---|---|---|---|
| 2006/0136246 A1* | 6/2006 | Tu | G06F 17/30256 725/52 |
| 2008/0077866 A1* | 3/2008 | Margulis | G11B 27/34 715/723 |
| 2011/0016395 A1* | 1/2011 | Margulis | G11B 27/34 715/716 |
| 2011/0167448 A1* | 7/2011 | Schein | G06F 3/0481 725/40 |
| 2011/0197131 A1* | 8/2011 | Duffin | G11B 27/105 715/720 |
| 2012/0054797 A1* | 3/2012 | Skog | H04N 21/4314 725/41 |
| 2012/0278840 A1* | 11/2012 | Glennon | H04N 21/4314 725/56 |
| 2013/0254820 A1* | 9/2013 | Bonomi | H04H 60/72 725/110 |
| 2015/0067738 A1* | 3/2015 | Lilleness | G06F 3/0488 725/58 |

* cited by examiner

| | Wednesday, October 16 | | | |
|---|---|---|---|---|
| Today | Image 1 Channel 1 | Image 2 Channel 2 | Image 3 Channel 3 | Image 4 Channel 4 |
| A-Z ▶ | | | | |
| 5:00 PM | Show 1 S.2, E.6 | Movie 1 Movie, Horror Mystery | Show 2 S.2, E.6 | Local Programming 1 Wednesday, Oct. 16 |
| 6:00 PM | Show 1 S.2, E.7 | | Show 2 S.2, E.7 | |
| 7:00 PM | Show 1 S.2, E.8 | Movie 2 Movie, Horror Mystery | Band 1 Music | News 1 Wednesday, Oct. 16 |
| 8:00 PM | Show 1 S.2, E.9 | LIVE | Band 2 Music | LIVE |

| Today | Wednesday, October 16 | | | |
|---|---|---|---|---|
| A-Z ▶ | [Image 1] Channel 1 | [Image 2] Channel 2 | [Image 3] Channel 3 | [Image 4] Channel 4 |
| | | Monday, October 14 | 302 ⌐ | |
| Yesterday | | Tuesday, October 15 | 304 ⌐ | |
| 5:00 PM | Show 1 S.2, E.6 | Movie 1 Movie, Horror Mystery | Show 2 S.2, E.6 | Local Programming 1 Wednesday, Oct. 16 |
| 6:00 PM | Show 1 S.2, E.7 | | Show 2 S.2, E.7 | |
| 7:00 PM | Show 1 S.2, E.8 | Movie 2 Movie, Horror Mystery | Band 1 Music | News 1 Wednesday, Oct. 16 |
| 8:00 PM | Show 1 S.2, E.9 | | Band 2 Music | |
| | | LIVE | | LIVE |

CUSTOMIZABLE ELECTRONIC PROGRAM GUIDE

CROSS REFERENCES TO RELATED APPLICATIONS

This application claims priority from U.S. Provisional Patent Application Ser. No. 62/077,773, entitled CUSTOMIZABLE ELECTRONIC PROGRAM GUIDE, filed on Nov. 10, 2014, which is hereby incorporated by reference as if set forth in full in this application for all purposes.

BACKGROUND

Electronic program guides provide a mechanism for viewers to see what programming is available for viewing on a variety of channels. Conventional electronic program guides are configured with channels listed in rows and times listed in columns. Searching can be executed based on time by the user traversing the several columns associated with time. Searching may also be executed based on the channel by traversing the several rows associated with the channel, or by entering a specific channel name and/or number into a search area. Such searching paradigms can be tedious and significantly reduce the user experience, particularly in situations where the user is searching for a specific show on a specific channel and has to traverse several rows and columns to obtain the desired information.

SUMMARY

Implementations generally relate to electronic program guides. In some implementations, a method includes causing a main view of an electronic program guide to be displayed. The method further includes receiving one or more user preferences associated with the electronic program guide. The method further includes causing content items to be displayed in the electronic program guide based on the one or more user preferences.

A further understanding of the nature and advantages of particular implementations disclosed herein may be realized by reference to the attached figures and remaining portions of the specification.

DETAILED DESCRIPTION OF EMBODIMENTS

Implementations generally relate to electronic program guides. Various implementations provide a customizable electronic program guide for use with content distribution services. As described in more detail below, implementations provide an electronic program guide configuration that is based on user preference or selection. In this manner, the presentation of the viewable content is customizable to the particular user, which makes searching for a particular network and content provider or particular piece of content easier to perform. The customizable electronic program guide also makes searching the vast array of available content easier for the user, thereby improving the user experience. As such, the user experience with the electronic program guide is positive in that content being searched for is more readily presented to the user without significant effort by the user.

In some implementations, a method includes causing a main view of an electronic program guide to be displayed. The method further includes receiving one or more user preferences associated with the electronic program guide. The method further includes causing content items to be displayed in the electronic program guide based on the one or more user preferences.

Figure 1:
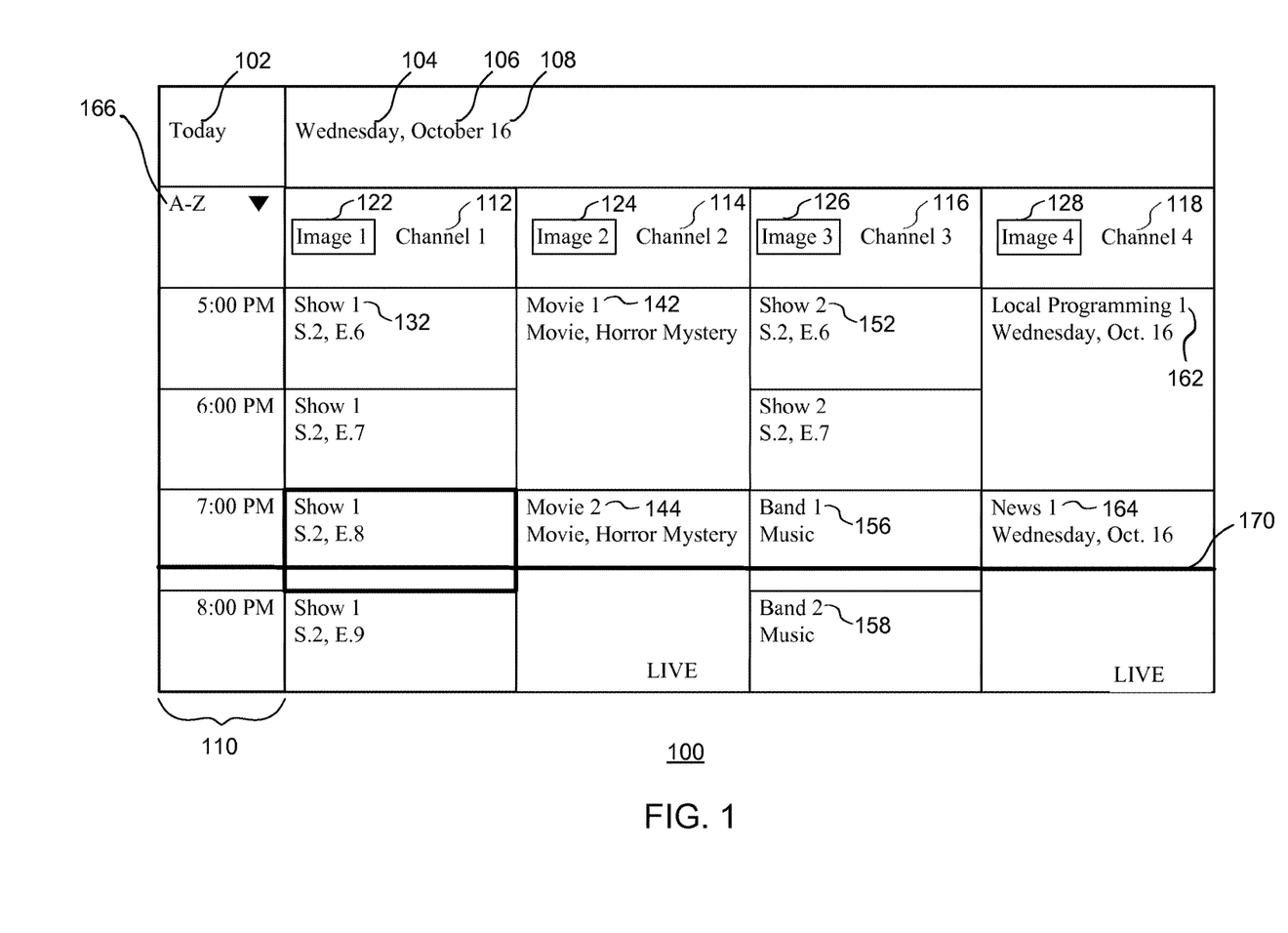
FIG. 1 illustrates a user interface that includes a main view of a customizable electronic program guide, according some implementations.

FIG. 1 illustrates a user interface that includes a main view 100 of a customizable electronic program guide, according some implementations. As shown, main view 100 shows the relative day 102 (e.g., "Today," "Yesterday," "Tomorrow," etc.), the day of the week 104 (e.g., "Monday," "Tuesday," "Wednesday," etc.), the month 106 (e.g., "January," "February," "March," etc.), and day of the month 108 (e.g., "1," "2," "3," etc.).

In various implementations, in main view 100, time is presented in a series of rows and channels are presented in a series of columns. With this configuration, the user can view the available content provided by the content providers in an easier to navigate manner than is currently available with conventional electronic program guides. As shown, in some implementations, main view 100 of electronic program guide indicates time displayed vertically in a column 110 that is positioned along the left-most side of main view 100. Different times are positioned in different rows and map to various media items of different content providers.

In some implementations, electronic program guide 100 displays channels and associated channel information (e.g., content provider information and/or images, etc.) in a row along the top portion of the interface. Presenting both the channel and/or content provider name and icon makes traversing the electronic program guide easier for the user to view and/or to scan the channels and programs.

In various implementations, channels of content providers are associated with columns of main view 100. Each channel is associated with a particular column, where information related to content items associated with respective channels is presented in the series of columns. For example, as shown, channels 112, 114, 116, and 118 (labeled "Channel 1," "Channel 2," "Channel 3," and "Channel 4," respectively) are presented, each having an associated column. Also, images 122, 124, 126, and 128 are shown adjacent to respective channels 112, 114, 116, and 118. In various implementations, images may be icons (e.g., logos for the content provider, etc.).

In various implementations, the currently viewed channel is presented in the first or left-most column, where the column includes content items (e.g., programming) available for the channel that is currently being viewed. For example, as shown, channel 112 is currently being viewed and is thus in the first or far-left column. Because users typically read from left-to-right, it is easier for a user to find and identify the content items available for viewing on the channel that is currently being watched when on the far left-hand side.

As shown in the column associated with channel 112 (labeled "Channel 1"), in the particular example, there is a show 132 (labeled "Show 1") at 5:00 PM, 6:00 PM, 7:00 PM, and 8:00 PM, with a different episode each hour (e.g., Season 2, Episode 6; Season 2, Episode 7; Season 2, Episode 8; Season 2, Episode 8; etc.). In some implementations, main view 100 may indicate the currently viewed show with a highlight or bold indication. For example, as shown, show 132 ("Show 1"), Season 2, Episode 8 is in bold.

In various implementations, one or more channels are presented in a set of one or more respective columns to the right of the column associated with the currently viewed channel based on one or more user preferences. As described in more detail herein, the user preference is the criteria set by the user in a selection menu 166 (e.g., a selection drop box). The result is a configuration selected by the user. For example, the user may have selected channel 114 as a favorite channel. As such, channel 114 may be presented in the next column as shown. Various example implementations of the selection drop box and user preferences are described in more detail below.

As shown in the column associated with channel 114 (labeled "Channel 2"), in this particular example, there is a movie 142 (labeled "Movie 1") at 5:00 PM, and a movie 144 (labeled "Movie 2") at 7:00 PM. In some implementations, main view 100 may indicate which media item is currently available to be viewed with an availability indication (e.g., a "Live" label). For example, as shown, movie 144 ("Movie 2") has a "Live" indication that indicates that movie 144 is currently available for viewing. In some implementations, main view 100 may also indicate the type of media item and genre if applicable. For example, as shown, movie 142 and movie 144 are labeled as movies and labeled as Honor Mysteries.

As shown in the column associated with channel 116 (labeled "Channel 3"), in this particular example, there is a show 152 (labeled "Show 2") at 5:00 PM and 6:00 PM, a band 156 (labeled "Band 1") at 7:00 PM, and a band 158 (labeled "Band 2") at 8:00 PM. In some implementations, main view 100 may also indicate the type of media item. For example, as shown, band 156 and band 158 are labeled as music.

As shown in the column associated with channel 118, in this particular example, there is a program 162 (labeled "Local Programming 1") at 5:00 PM and news 164 (labeled "News 1") at 7:00 PM. In some implementations, main view 100 may also indicate a date associated with each program. For example, as shown, program 162 and news 164 are labeled with the date, "Wednesday, October 16." Note that in various implementations, the terms show and program may be used interchangeably in the context of a show and programs being media items with media content to be accessed by a user. In some implementations, the term show may be used in the context of television shows or episodes of television series. In some implementations, the term program may be used more broadly to include news programming, weather programming, music stations, and movies. In some implementations, the term media item may be used to describe shows, news programming, weather programming, music stations, movies, etc.

In various implementations, main view 100 includes a selection menu 166 (labeled "A-Z"). In some implementations, selection menu 166 may be positioned in the upper left hand corner of the interface. The particular location may vary, and will depend on the particular implementation. As described in more detail below, selection menu 166 enables the user to select one or more user preferences for configuring main view 100 of the electronic program guide. Implementations of selection menu 166 are described in more detail herein.

In various implementations, main view 100 includes a moveable timeline 170. In some implementations, moveable timeline 170 provides the user with a visual indication of the current time and the amount of time remaining in a currently playing or available media item (e.g., show, program, etc.). In some implementations, moveable timeline 170 traverses the entire width of main view 100 across all columns displayed. By traversing the entire width of main view 100, moveable timeline 170 indicates the current time and amount of time remaining for all media items shown in main view 100. If the user scrolls to the right in order to view more channels, those channels and corresponding media items will appear in main view 100. As such, moveable timeline 170 will indicate the current time and amount of time remaining for the media items (e.g., shows, programs, etc.) of those channels.

In various implementations, moveable timeline 170 moves temporally along the times or series of times. For example, as shown in FIG. 1, the times (e.g., 5:00 PM, 6:00 PM, 7:00 PM, 8:00 PM, etc.) are each shown in different rows, and stacked in a single column. Moveable timeline 170 moves based on the time of day. For example, in this particular example implementation, moveable timeline 170 moves downward over time in order to correspond to the times shown. If the time of day is 7:00 PM, moveable timeline 170 would be at a position corresponding to 7:00 PM (e.g., positioned at the top of the box for each show or program starting at 7:00 PM). As shown, moveable timeline 170 is positioned three-quarters down within the 7:00 PM box, which corresponds to 7:45 PM. This indicates to the user that the current time and the amount of time remaining in a currently playing or available show or program. For example, Show 1, Season 2, Episode 8 is about three-quarters over with about one-quarter remaining. Movie 2 is about 45 minutes into the movie and has about an hour and 15 minutes remaining (assuming a 2 hour movie).

Figure 4:
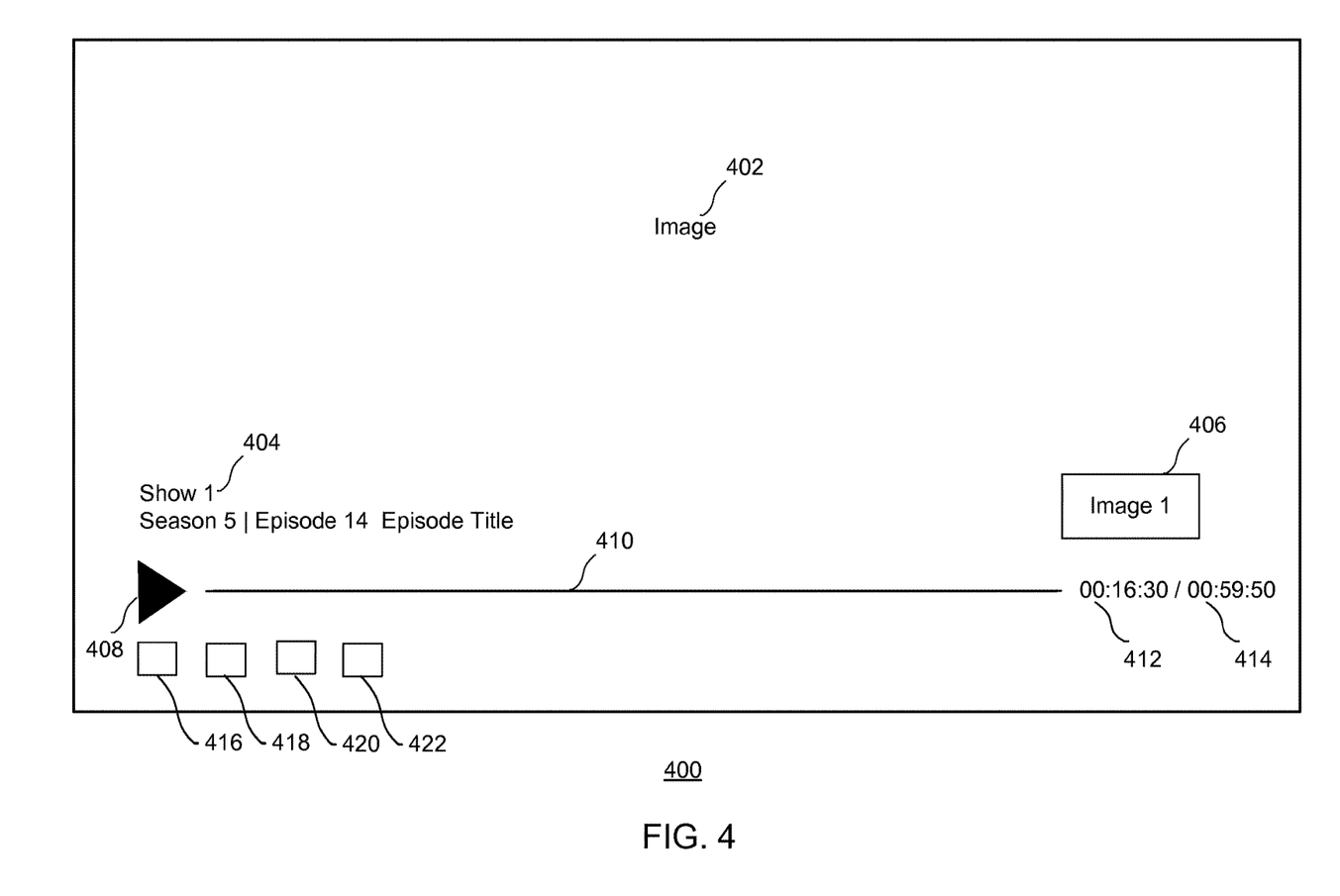
FIG. 4 illustrates a user interface that includes a selected content item view corresponding to content selected by a user, according some implementations.

In various implementations, when the user moves over a particular program title, the content box corresponding to the program is highlighted. If this content box is selected, the tuner is tuned to the corresponding channel and the selected content is presented to the user on a corresponding display as illustrated in FIG. 4. The user may then watch the selected program.

Figure 2:
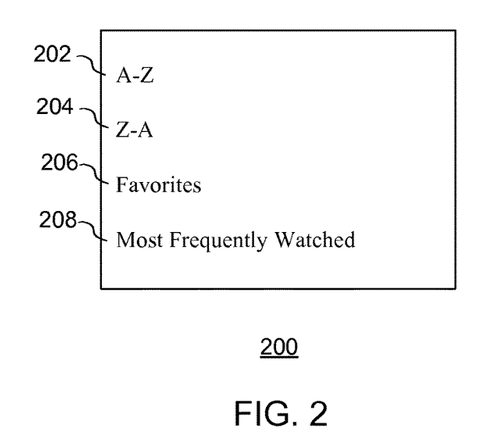
FIG. 2 illustrates a user interface that includes a menu associated with the customizable electronic program guide, according some implementations.

FIG. 2 illustrates a user interface that includes a menu 200 associated with the customizable electronic program guide, according some implementations. As shown, menu 200 includes multiple viewing settings or user preferences that a user may select in order to tailor or customize the electronic program guide to suit their particular viewing habits and needs. In various implementations, menu 200 provides a list of selections associated with orderings in which channels are displayed in the user interface.

In various implementations, menu 200 enables a user to order channels displayed in the electronic program guide based on one or more of alphabetical order, favorites, and popularity. For example, in various implementations, the channels may be listed based on alphabetical order, based on favorites (e.g., favorite channel and/or favorite content providers, based on popularity or viewing frequency (e.g., frequency with which the user watches programming on the one or more networks or content provider outlets) or other applicable criteria. As shown, for example, the user preferences may include a first alphabetical ordering 202 (e.g., "A to Z"), a second alphabetical ordering 204 (e.g., "Z to A"), favorites channels 206 (e.g., "Favorites"), popularity/viewing frequency 208 (e.g., "Most Frequently Watched"), etc. These selections enable the channel information to be customizable to the user.

The particular user interface for menu 200 may vary, and will depend on the particular implementation. For example, in various implementations, selection menu 166 may be a drop box, drop-down menu, or any suitable selection indicator or appropriate selection mechanism.

In some implementations, a default presentation may be that the currently viewed channel is presented in the first or left-most column. The remaining columns may be ordered or configured in alphabetical order by default.

In some implementations, the channels may be listed in alphabetical order. For example, referring again to FIG. 1, if the user selected an alphabetical ordering for the search results (e.g., A-Z), the channels (columns) will be listed in alphabetical order from left to right (after the column associated with the currently viewed channel). For example, the set of columns to the right of the column associated with the currently viewed channel (e.g., channel 112) would be ordered in alphabetical order. The particular number of columns (or channels) in the set may vary, and will depend on the particular implementation. For example, there may be a predetermined number (e.g., 1, 2, 3, 4, 5, etc.) of columns in the set. In some implementations, the remaining column groups may be in alphabetical order.

In some implementations, the channels may be listed in the order of popularity/viewing frequency. For example, if the user selects popularity ordering for the results, the content providers will be listed from left to right in order of popularity ratings (after the column associated with the currently viewed channel). In various implementations, such popularity ratings may be based on information provided by a social network or viewing monitoring protocol such as Nielsen ratings. The particular techniques for determining the popularity of the channels may vary, and will depend on the particular implementation. For example, popularity may be based on third party users that are connected to the user directly or indirectly through a social or other network. In some implementations, shows with the same popularity or viewing frequency may be presented in alphabetical order by default.

In some implementations, the channels may be listed in the order of favorites (e.g., favorite channels or content providers). For example, if the user selects favorites, the channels or content providers will be listed based on the favorite status selected by the user. The content provided by these favorite channels will be presented in the first few columns of the electronic program guide (after the column associated with the currently viewed channel), with the remaining channels available for viewing by the user being presented thereafter. In some implementations, if multiple channels are presented based on favorites, those favorite channels may be present in alphabetical order by default. In some implementations, the remaining channels (e.g., non-favorite channels) available for viewing by the user may be presented in alphabetical order by default.

Other user preferences and/or criteria are possible, and will depend on the particular implementation. For example, in some implementations, the channels may be listed in the order of time remaining. If the user selects an ordering based on time remaining, the channels will be listed according to the amount of time a particular piece of content will available for viewing on those particular outlets (e.g., 1 day, 2 days, 3 days, etc.). In this manner, the user is given an opportunity to view such content before it is no longer available for viewing.

Figure 3:
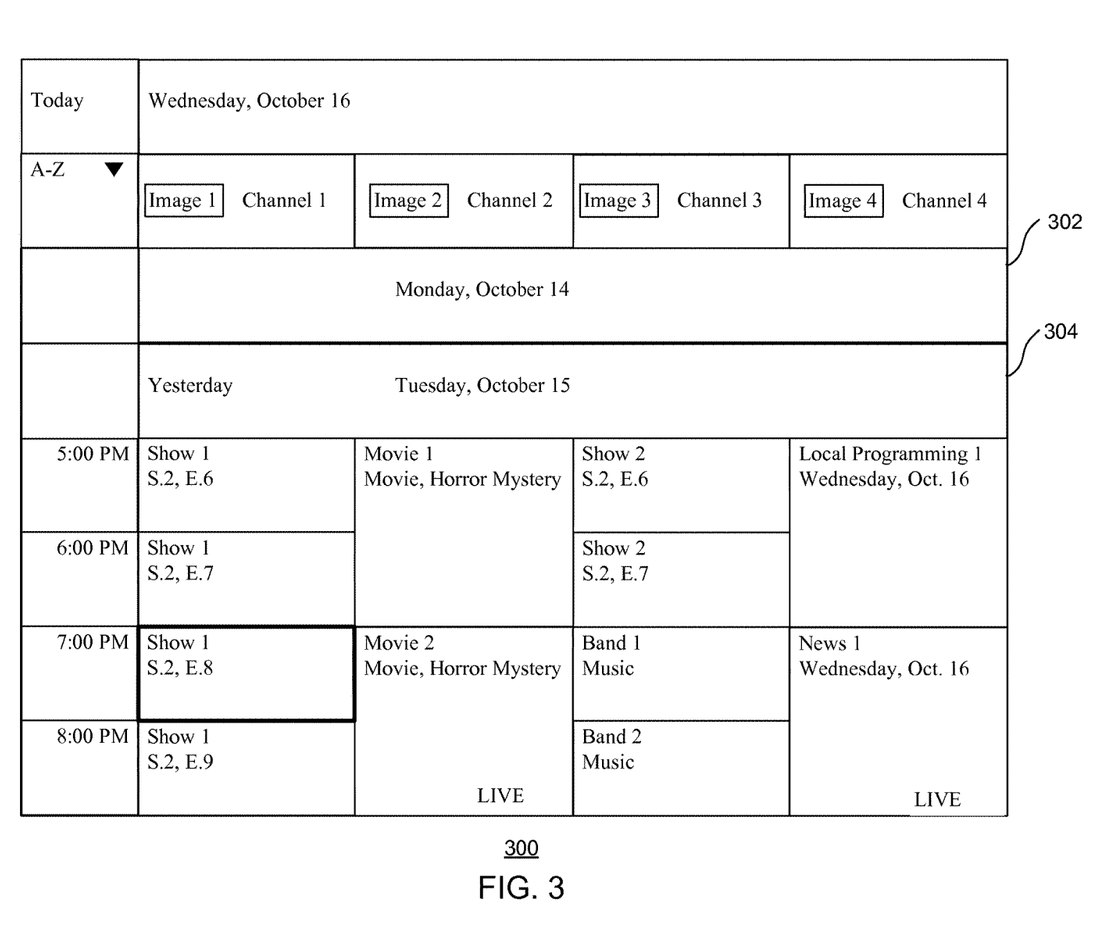
FIG. 3 illustrates a user interface that includes a daily view of a customizable electronic program guide, according some implementations.

FIG. 3 illustrates a user interface that includes a daily view 300 of a customizable electronic program guide, according some implementations. In various implementations, the content listings are presented on a daily basis. As such, the electronic program guide presentation allows the user to view the daily program or content listings for multiple channels on a single screen. In some implementations, there may be multiple daily views organized by day. For example, as shown in FIG. 3, there may be a selectable tab 302 for one day (e.g., Monday, October 14, etc.). There may be another selectable tab 304 for another day (e.g., Tuesday, October 15, etc.).

In various implementations, the user may select one of the tabs in order to expand or collapse the information for the respective days. This enables the user to go forward or backward in days to view content information for those days. The user may then span multiple days in order to select particular content items to view.

In various implementations, when the user moves over a particular program title, the content box corresponding to the program is highlighted. If this content box is selected, the tuner is tuned to the corresponding channel or is directed to a location where the content may be accessed from (e.g., uniform resource locator (URL)) and the selected content is presented to the user on a corresponding display as illustrated in FIG. 4. The user may then watch the selected program. In various implementations, the selected content may be downloaded or streamed from the corresponding location. In some implementations, where the electronic program guide is used as part of a streaming service, the content box may be associated with a particular URL. In some implementations, when the URL is accessed, the electronic program guide provides for streaming of the associated content to the user as long as the user is authorized to access and view such content.

FIG. 4 illustrates a user interface that includes a selected content item view 400 corresponding to content selected by a user, according some implementations. As shown, selected content item view 400 includes an image 402, where image 402 represents the content (e.g., video) being played. Selected content item view 400 includes the program 404 (e.g., "Show 1") and related information (e.g., "Season 5|Episode 14," "Episode Title," etc.), and may include an image 406 associated with the program. For example, image 406 may be an icon (e.g., logo for the particular show or program, etc.).

Selected content item view 400 may also include a play button 408, a timeline 410 that indicates of how much playing time is remaining in a particular program, the amount of time 412 that the program has been running, and the length of time 414 of the program.

Selected content item view 400 may also include control buttons 416, 418, 420, and 422. For example, a control button may enable the user to select closed captioning. A control button may enable the user to "like" or "favorite" the program. A control button may enable the user to rate the program. A control button may enable the user to access more information about the program. A control button may enable the user to fast forward/rewind the content during playback. A control button may enable the user to re-start the content from the beginning. The particular functions of control buttons 416, 418, 420, and 422 may vary, and will depend on the particular implementation.

If the user wants more information relating to a particular program, the user may depress an information control button in selected content item view 400, or on a corresponding remote control device or other controller. As such, more detailed information relating to the selected content may be displayed. In an alternate embodiment, after the user depresses the information control button, a gallery page presenting all of the available episodes or versions of the highlighted or selected content will be displayed, as illustrated in FIG. 5, for example.

Figure 5:
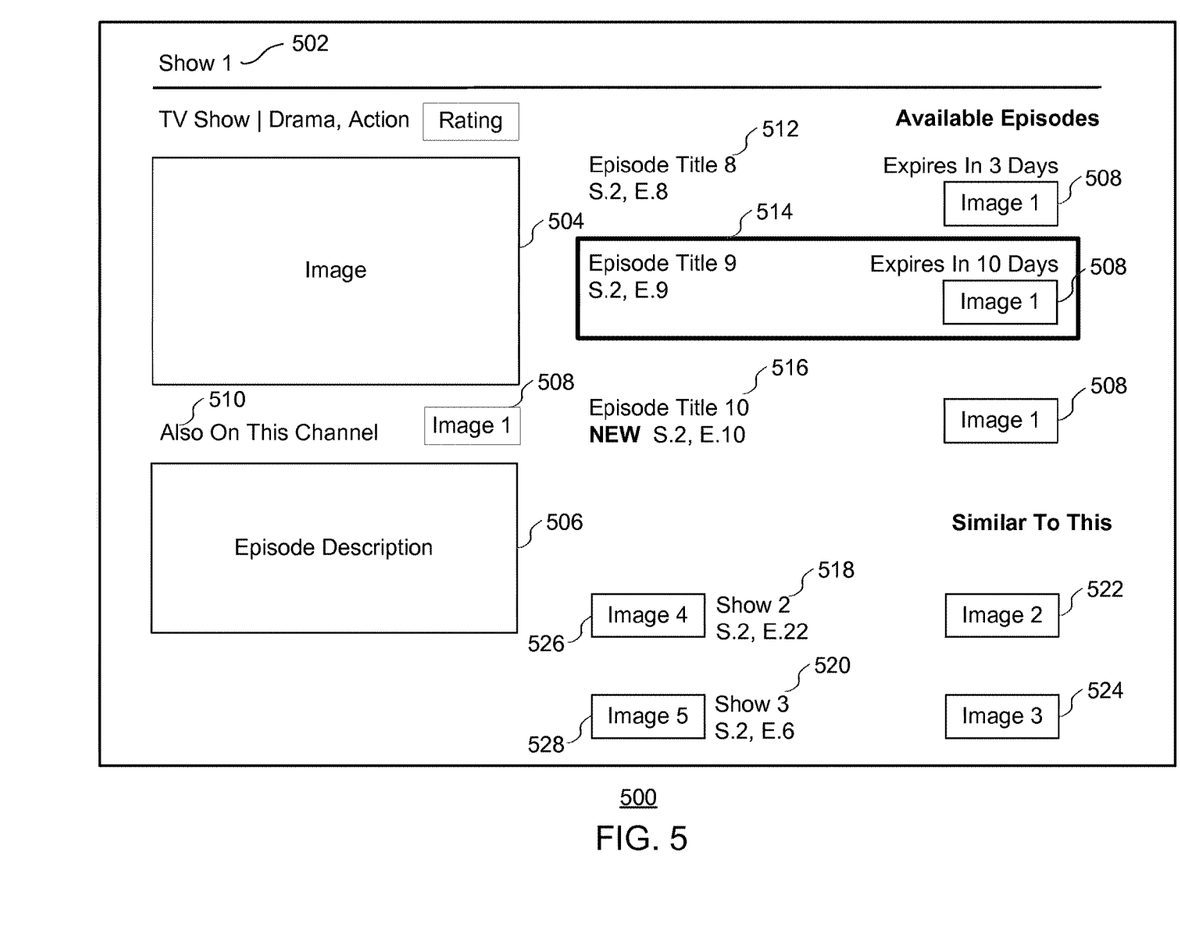
FIG. 5 illustrates a user interface that includes a detailed view corresponding to content selected by a user, according some implementations.

FIG. 5 illustrates a user interface that includes a detailed view 500 corresponding to content selected by a user, according some implementations. As shown, detailed view 500 includes the program or show 502 and an image 504, where image 504 may be a frame of a scene from a particular program episode. Detailed view 500 may also include an episode description 506 and an image 508, wherein image 508 may be an image that is associated with the show or program (e.g., a logo for the show or program, etc.). Detailed view 500 may also include a link 510 that enables the user to view other shows or programs on the channel.

In various implementations, detailed view 500 includes other available episodes 512, 514, and 516 with the corresponding image 508 for the show. In some implementations, detailed view 500 may indicate if a particular episode (e.g., episode 516) is a new episode. Detailed view 500 may also include other available programs or shows 518 and 520 with corresponding images 522 and 524 corresponding to the respective shows (e.g., logos for the respective shows). Detailed view 500 may also include images 526 and 528 corresponding to the respective channels or content providers (e.g., logos for the respective channels or content providers). Although the available shows listing is illustrated as being in a vertical alignment, it will be appreciated and understood that the available shows listing of the detail view 500 may also have a horizontal alignment which may be placed at the bottom portion of the detail view page 500.

Figure 6:
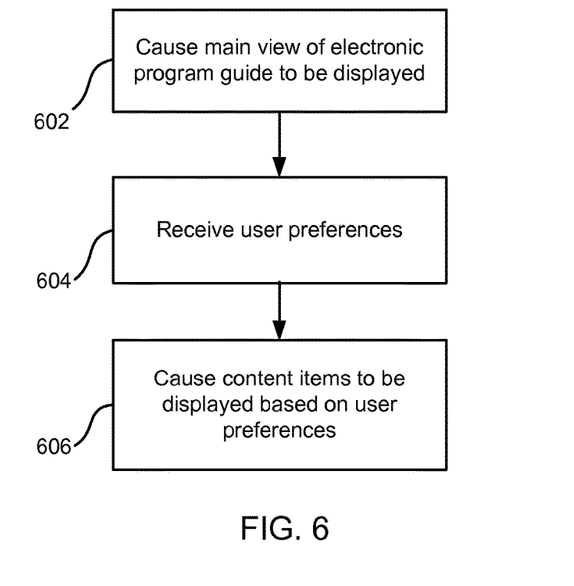
FIG. 6 illustrates an example flow diagram for providing a customizable electronic program guide, according to some implementations.

FIG. 6 illustrates an example flow diagram for providing a customizable electronic program guide, according to some implementations. Referring to both FIGS. 1 and 6, a method is initiated in block 602, where the system causes main view 100 of the electronic program guide to be displayed to a user. As indicated herein, in various implementations, the system causes the time to be presented in rows, where each time is associated with a different row. In various implementations, the system causes the channels to be presented in columns. In various implementations, the channels are presented in alphabetical order.

In various implementations, the system causes moveable timeline 170 to be displayed in main view 100. As described herein, in various implementations, moveable timeline 170 provides a user with a visual indication of the current time and the amount of time remaining in currently playing and available media items.

In block 604, the system receives one or more user preferences from the user, where the one or more user preferences are associated with the electronic program guide. As indicated herein, in various implementations, the system enables a user to select preferences (e.g., from a selection menu) to order channels displayed in the electronic program guide based on one or more of alphabetical order, favorites, and popularity.

In block 606, the system causes content items to be displayed in the electronic program guide based on the one or more user preferences. For example, in various implementations, the channels may be listed based on alphabetical order, based on favorites (e.g., favorite channel and/or favorite content providers), based on popularity or viewing frequency (e.g., frequency with which the user watches programming on the one or more networks or content provider outlets) or other applicable criteria.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Implementations described herein provide various benefits. For example, implementations provide a user an easier way to navigate the variety of channels and associated content. Implementations described herein also make the user experience with the electronic program guide positive in that content being searched for is more readily presented to the user without significant effort by the user. Implementations described herein enable the user to quickly find the content that the user wishes to view by not being required to review channels or other channel information the user is not interested in, thereby enhancing the view experience.

Figure 7:
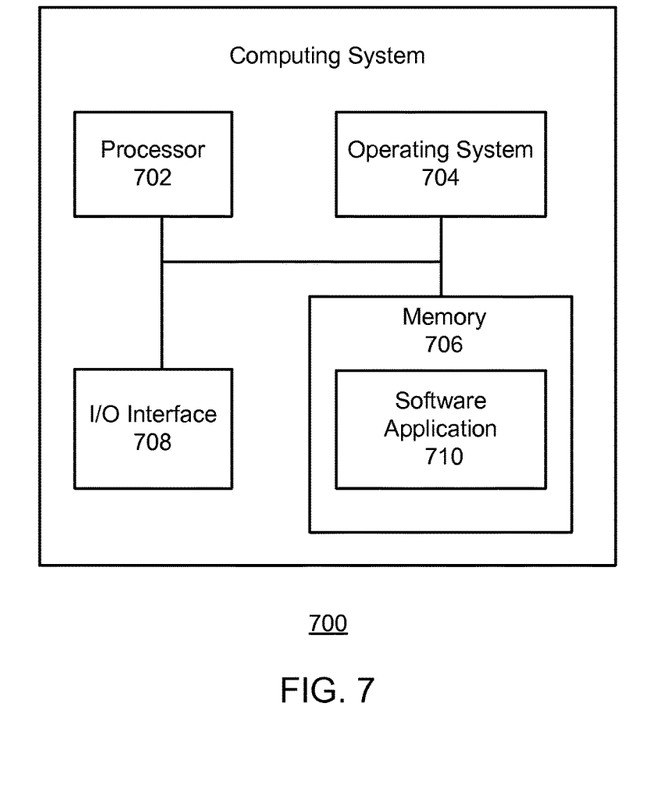
FIG. 7 illustrates a block diagram of an example system, which may be used for implementations described herein.

FIG. 7 illustrates a block diagram of an example computing system 700, which may be used for implementations described herein. In some implementations, computing system 700 may include a processor 702, an operating system 704, a memory 706, and an input/output (I/O) interface 708. In various implementations, processor 702 may be used to implement various functions and features described herein, as well as to perform the method implementations described herein. While processor 702 is described as performing implementations described herein, any suitable component or combination of components of computing system 700 or any suitable processor or processors associated with computing system 700 or any suitable system may perform the steps described. Implementations described herein may be carried out on a user device, for example, a game console, a set top box, a mobile device such as a tablet computer or a smartphone, a laptop computer, a desktop computer, on a server, or a combination of both.

Computing system 700 also includes a software application 710, which may be stored on memory 706 or on any other suitable storage location or computer-readable medium. Software application 710 provides instructions that enable processor 702 to perform the functions described herein and other functions. The components of computing system 700 may be implemented by one or more processors or any combination of hardware devices, as well as any combination of hardware, software, firmware, etc.

For ease of illustration, FIG. 7 shows one block for each of processor 702, operating system 704, memory 706, I/O interface 708, and software application 710. These blocks 702, 704, 706, 708, and 710 may represent multiple processors, operating systems, memories, I/O interfaces, and software applications. In various implementations, computing system 700 may not have all of the components shown and/or may have other elements including other types of components instead of, or in addition to, those shown herein.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a tangible medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A computer-implemented method for providing an electronic program guide, the method comprising:
   causing a main view of an electronic program guide to be displayed;
   receiving one or more user preferences associated with the electronic program guide;
   causing content items to be displayed in the electronic program guide based on the one or more user preferences, wherein time is presented in a plurality of rows, and wherein channels are presented in a plurality of columns; and
   causing a moveable timeline to be displayed in the main view, wherein the moveable timeline traverses an entire width of the plurality of columns of the main view; and
   causing the moveable timeline to move downward relative to the rows based on a time of day, wherein the rows remain static, wherein the moveable timeline provides a user with a visual indication of a current time based on a position of moveable timeline relative to the plurality of rows, and wherein the moveable timeline provides a visual indication of a length of time of a currently playing media item, an amount of time remaining in currently playing and available media items, and an amount of time that the currently playing media item has been running based on the position of moveable timeline relative to the plurality of rows.

2. The method of claim 1, wherein a currently viewed channel of a plurality of channels is presented in a first column.

3. The method of claim 1, wherein one or more channels are presented in a set of one or more respective columns to a right of a column associated with a currently viewed channel based on one or more user preferences.

4. The method of claim 1, further comprising providing a menu, wherein the menu enables a user to select one or more user preferences for configuring a main view of the electronic program guide.

5. The method of claim 1, further comprising providing a menu, wherein the menu enables a user to select one or more user preferences for configuring a main view of the electronic program guide, and wherein the menu provides a list of selections in which channels are displayed.

6. The method of claim 1, further comprising providing a menu, wherein the menu enables a user to order channels displayed in the electronic program guide based on one or more of alphabetical order, favorites, and popularity.

7. Software encoded in one or more non-transitory computer-readable media for execution by one or more processors and when executed operable to perform operations comprising:
   causing a main view of an electronic program guide to be displayed;
   receiving one or more user preferences associated with the electronic program guide;

causing content items to be displayed in the electronic program guide based on the one or more user preferences, wherein time is presented in a plurality of rows, and wherein channels are presented in a plurality of columns; and causing a moveable timeline to be displayed in the main view, wherein the moveable timeline traverses an entire width of the plurality of columns of the main view; and causing the moveable timeline to move downward relative to the rows based on a time of day, wherein the rows remain static, wherein the moveable timeline provides a user with a visual indication of a current time based on a position of moveable timeline relative to the plurality of rows, and wherein the moveable timeline provides a visual indication of a length of time of a currently playing media item, an amount of time remaining in currently playing and available media items, and an amount of time that the currently playing media item has been running based on the position of moveable timeline relative to the plurality of rows.

8. The software of claim 7, wherein a currently viewed channel of a plurality of channels is presented in a first column.

9. The software of claim 7, wherein one or more channels are presented in a set of one or more respective columns to a right of a column associated with a currently viewed channel based on one or more user preferences.

10. The software of claim 7, wherein the software when executed is further operable to perform operations comprising providing a menu, wherein the menu enables a user to select one or more user preferences for configuring a main view of the electronic program guide.

11. The software of claim 7, wherein the software when executed is further operable to perform operations comprising providing a menu, wherein the menu enables a user to select one or more user preferences for configuring a main view of the electronic program guide, and wherein the menu provides a list of selections in which channels are displayed.

12. The software of claim 7, wherein the software when executed is further operable to perform operations comprising providing a menu, wherein the menu enables a user to order channels displayed in the electronic program guide based on one or more of alphabetical order, favorites, and popularity.

13. A system comprising:
one or more processors;
one or more non-transitory computer-readable storage media; and
logic encoded in the one or more non-transitory computer-readable media for execution by the one or more processors, and when executed operable to perform operations comprising:
causing a main view of an electronic program guide to be displayed;
receiving one or more user preferences associated with the electronic program guide;
causing content items to be displayed in the electronic program guide based on the one or more user preferences, wherein time is presented in a plurality of rows, and wherein channels are presented in a plurality of columns; and
causing a moveable timeline to be displayed in the main view, wherein the moveable timeline traverses an entire width of the plurality of columns of the main view; and
causing the moveable timeline to move downward relative to the rows based on a time of day, wherein the rows remain static, wherein the moveable timeline provides a user with a visual indication of a current time based on a position of moveable timeline relative to the plurality of rows, and wherein the moveable timeline provides a visual indication of a length of time of a currently playing media item, an amount of time remaining in currently playing and available media items, and an amount of time that the currently playing media item has been running based on the position of moveable timeline relative to the plurality of rows.

14. The system of claim 13, wherein a currently viewed channel of the channels is presented in a first column.

15. The system of claim 13, wherein one or more channels are presented in a set of one or more respective columns to a right of a column associated with a currently viewed channel based on one or more user preferences.

16. The system of claim 13, wherein the logic when executed is further operable to perform operations comprising providing a menu, wherein the menu enables a user to select one or more user preferences for configuring a main view of the electronic program guide.

* * * * *